(12) United States Patent
Heda et al.

(10) Patent No.: US 8,142,138 B2
(45) Date of Patent: Mar. 27, 2012

(54) TURBINE ENGINE HAVING COOLING PIN

(75) Inventors: Sanjeev Heda, Kennesaw, GA (US);
Robert W. Coign, Piedmont, SD (US);
Kevin L. Bruce, Greer, SC (US)

(73) Assignee: General Electric Company, Schenectady, NY (US)

( * ) Notice: Subject to any disclaimer, the term of this patent is extended or adjusted under 35 U.S.C. 154(b) by 446 days.

(21) Appl. No.: 12/434,277

(22) Filed: May 1, 2009

(65) Prior Publication Data
US 2010/0278631 A1 Nov. 4, 2010

(51) Int. Cl.
*F01D 25/12* (2006.01)
(52) U.S. Cl. ............... 415/115; 415/173.1; 415/176; 415/119
(58) Field of Classification Search .......... 415/115–117, 415/173.1, 176, 173.3, 178, 173.4, 119
See application file for complete search history.

(56) References Cited

U.S. PATENT DOCUMENTS

| | | | |
|---|---|---|---|
| 3,682,564 A * | 8/1972 | Feeney | 415/16 |
| 5,209,652 A * | 5/1993 | Fischer et al. | 417/409 |
| 6,416,279 B1 | 7/2002 | Weigand et al. | |
| 6,749,395 B1 | 6/2004 | Reichert et al. | |
| 6,910,851 B2 * | 6/2005 | Franconi et al. | 415/115 |
| 6,931,859 B2 | 8/2005 | Morgan et al. | |
| 7,117,983 B2 | 10/2006 | Good et al. | |
| 7,237,386 B2 | 7/2007 | Hoffmann et al. | |
| 2004/0253097 A1 * | 12/2004 | Kao | 415/204 |
| 2010/0266382 A1 * | 10/2010 | Campe et al. | 415/1 |
| 2011/0088393 A1 * | 4/2011 | Romblom et al. | 60/605.2 |

* cited by examiner

*Primary Examiner* — Gary F. Paumen
(74) *Attorney, Agent, or Firm* — Fletcher Yoder PC

(57) ABSTRACT

In one embodiment, a turbine system may include a turbine casing, a shroud block coupled to the turbine casing, a fluid passage in the shroud block; and a pin configured to interface with the fluid passage. The pin may include a hollow shaft; a rod inserted into the hollow shaft; and a valve disposed on a distal end of the rod, wherein the valve is configured to open and close the fluid passage when the rod is actuated remotely through the hollow shaft.

21 Claims, 8 Drawing Sheets

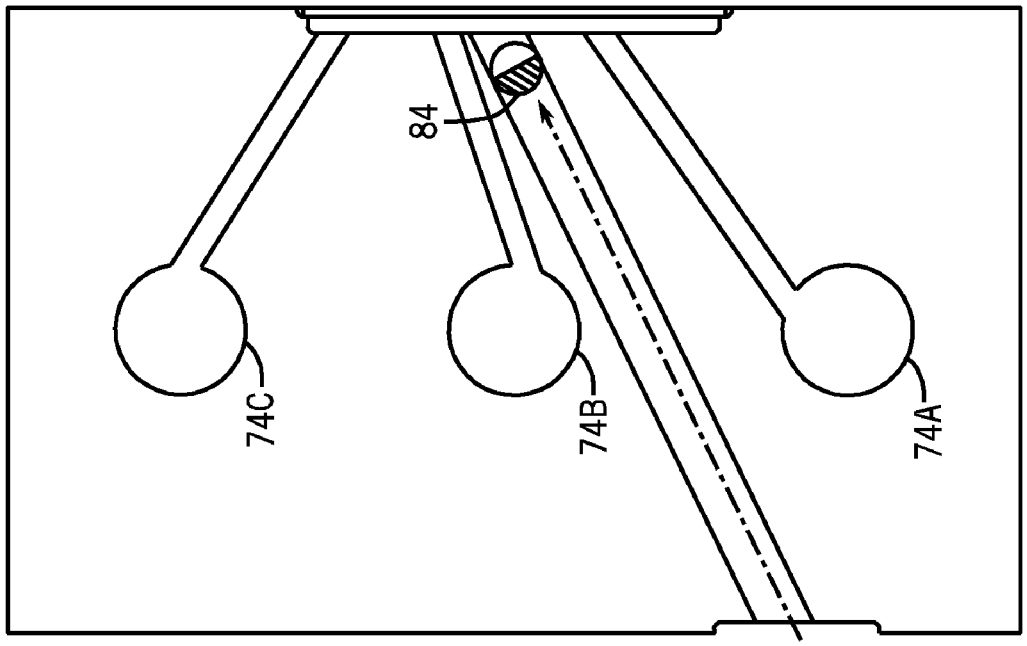
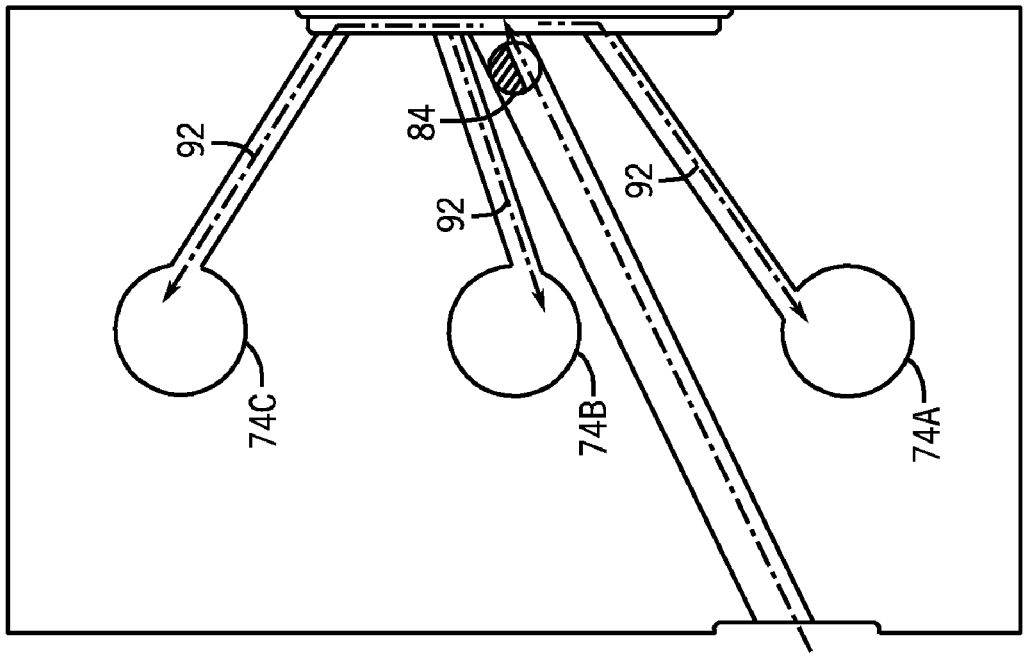

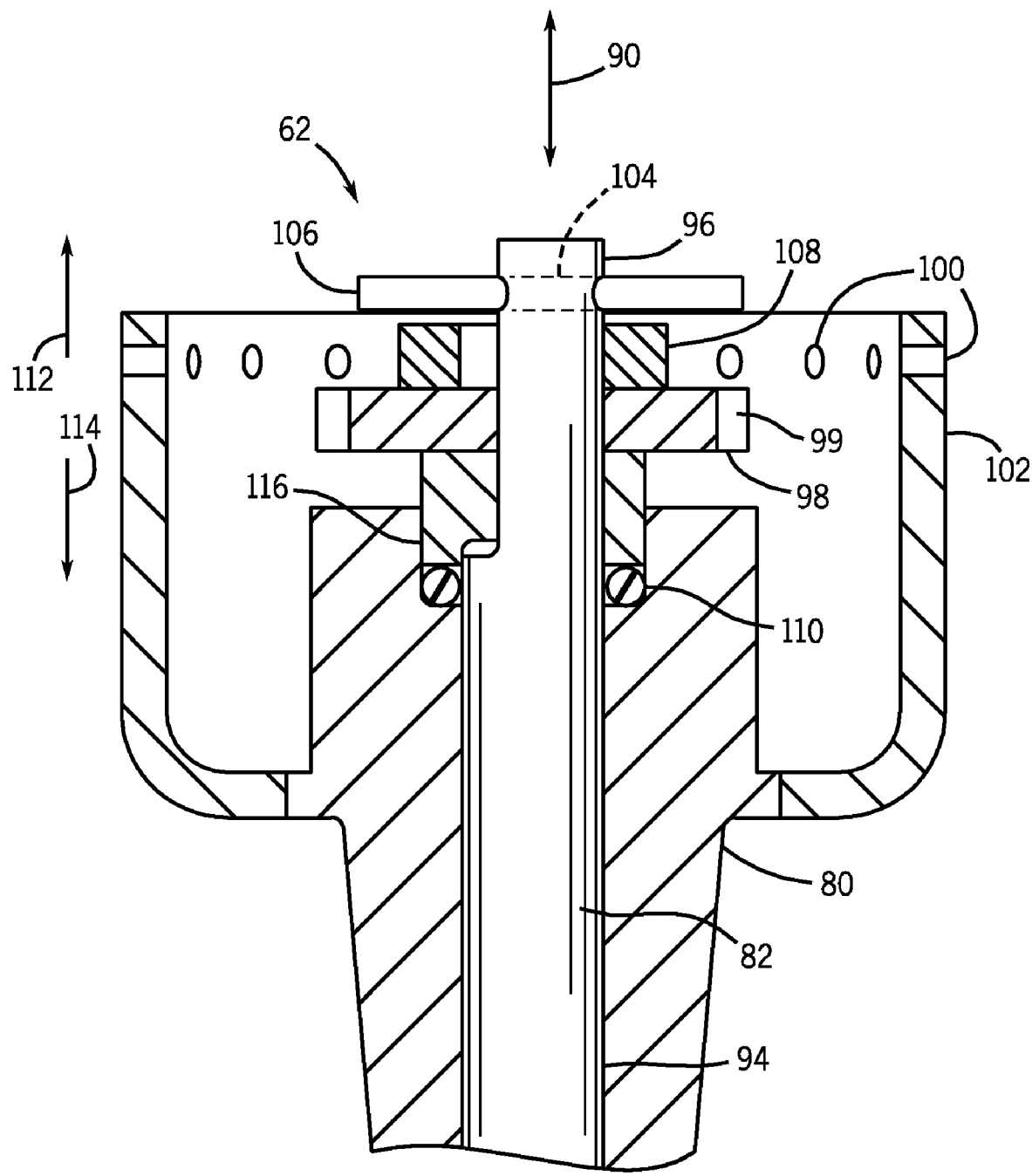
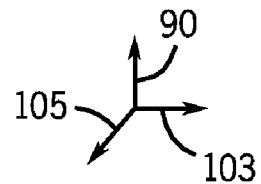
FIG. 7

__US 8,142,138 B2__

TURBINE ENGINE HAVING COOLING PIN

BACKGROUND OF THE INVENTION

The subject matter disclosed herein relates to gas turbine engines, and more specifically, to flow control assemblies for modulating the flow of cooling fluids to components of a gas turbine engine.

Gas turbine engines include a turbine having multiple blades attached to a central rotor. Hot combustion gases from a set of combustors flow through these blades, inducing the rotor to rotate. Minimizing the quantity of gas bypassing the blades enhances energy transfer from the gas flow to the turbine rotor. Therefore, a turbine shroud may be disposed inside a turbine casing to reduce the distance between turbine blade tips and the casing. Under elevated temperatures of operation, gas turbine engine components, in particular rotating components in the gas path and their shrouds, may experience wear and tear. These components may be cooled by the flow of cooling fluids in and around the components. However, in order to increase the operating efficiency of the engine, the engine is generally well-sealed to prevent leakage of the hot gases out of the engine. Accordingly, routing cooling fluids to the hot parts of the engine is complex.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a turbine system may include a turbine casing, a shroud block coupled to the turbine casing, a fluid passage in the shroud block; and a pin configured to interface with the fluid passage. The pin may include a hollow shaft; a rod inserted into the hollow shaft; and a controlling feature disposed on the rod, wherein the controlling feature is configured to open and close the fluid passage when the rod is rotated about an axis of the rod and the hollow shaft.

In another embodiment, a turbine system may include a stator component including a cooling fluid passage; and an anti-rotation pin mounted in a receptacle in the stator component. The anti-rotation pin may include a hollow shaft; a rod inserted into the hollow shaft, wherein a distal end of the rod extends beyond the hollow shaft into the cooling fluid passage; and a valve disposed on the distal end of the rod, wherein the valve is configured to open and close when the rod is rotated about an axis of the rod and the hollow shaft.

In another embodiment, the anti-rotation pin may include a hollow shaft; a rod inserted into the hollow shaft; and a valve disposed on a portion of the rod extending past the hollow shaft along an axis of the rod and the hollow shaft, wherein the valve is configured to be opened and closed when the rod is moved relative to the hollow shaft.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 5A is a cross-sectional top view of multiple plenum chambers within a shroud block with fluid flow when a valve is open;

FIG. 5B is a cross-sectional top view of multiple plenum chambers within a shroud block with fluid flow interrupted when a valve is closed;

FIG. 7 is a cutaway side view of an anti-rotation pin in accordance with an embodiment of the present technique.

DETAILED DESCRIPTION OF THE INVENTION

Figure 1:
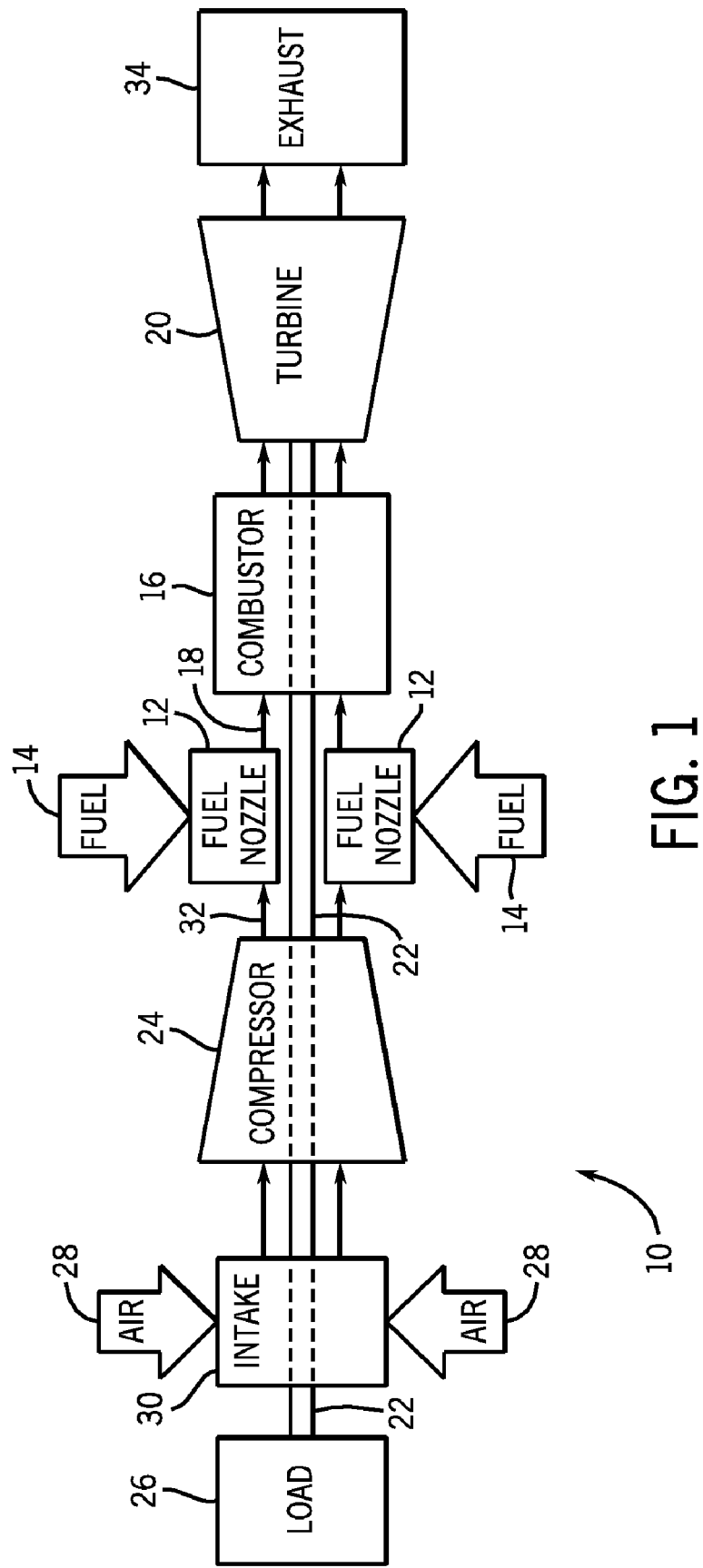
FIG. 1 is a block diagram of a turbine system in accordance with an embodiment of the present technique.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Provided herein are externally-controlled devices for metering internal flow of fluids (e.g., cooling fluids) to components of a gas turbine engine. During operation, a turbine engine generates hot combustion gases that are directed throughout parts of the engine. In the interest of engine efficiency, it is desirable to prevent leakage of these combustion gases and route the gases through one or more turbine stages to generate power. Accordingly, the stator components of the engine may be designed to withstand higher temperatures. However, even in light of temperature-resistant casings and other stator components, it may be advantageous to strategically direct cooling fluids to certain components of the engine to maintain desired operating temperatures.

Stator components of the engine may be assembled in segments in an axial direction, e.g., segments assembled one after another along an axis of an engine's rotating shaft, and/or a circumferential direction, e.g., segments assembled to substantially surround the shaft or other mechanical components. In either example, the segments may be assembled with a goal of encasing rotating and/or moveable components. In addition, the segments may surround rotating components that are aligned with respect to the stator components to maintain a desired minimal clearance to preserve efficiency. For examples, the stator components may be designed to experience minimal heat expansion so that the clearance does not substantially change with increasing temperatures. To that end, a single segment may include multiple structures for withstanding high temperatures as well as structures for damping vibration and reducing the impact of motion, e.g., the rotation of the shaft, on the stator components. Accordingly, the stator components may be fastened together, either within a single segment or between two or more segments, with anti-rotation pins designed to maintain position. Exemplary stator components, according to embodiments, may include turbine casings and turbine shroud blocks.

In embodiments, the externally controlled devices may include any device accessible from the ambient air environment outside the engine. Such devices may extend through the stator components to meter the flow of internal air, which may be cooling air or, in embodiments, may be hot fluids. In one embodiment, anti-rotation pin may be used to control the flow of air inside the stator components. Such pins may include valves or other structures for metering cooling fluids to specific parts of a stator component. The valves may be actuated on an exterior surface of a turbine engine to allow an operator or an actuator to fine-tune cooling of the stator components. The pins may be inserted into pre-existing passages designed to receive anti-rotation pins. In contrast to other arrangements in which the anti-rotation pins may only serve the single purpose of providing attachment position, the embodiments described herein relate to anti-rotation pins that may control cooling as well as provide such attachment position. Because multiple anti-rotation pins may be distributed throughout the stator components, cooling may be directed to a very narrow region by actuating a valve on a single anti-rotation pin. In addition, because the anti-rotation pins may control valves or openings to cooling fluid passages within the stator components, the actuation of the pins does not allow fluids to escape through the passage in which the anti-rotation pin has been inserted. In other words, the pins do not control cooling by injecting ambient air into the stator components. Rather, the pins are externally controlled to meter internal fluids within the stator component through the passage of the pin. The pins merely allow an operator to open or close the valves by actuating a component on the pin. By operating in such a manner, leaks of hot air from the internal parts of the engine may be avoided.

Turning now to the drawings and referring first to FIG. 1, a block diagram of an embodiment of a turbine system 10, which may incorporate the anti-rotation pins as further described below, is illustrated. The diagram includes a fuel nozzle 12, a fuel supply 14, and combustor 16. As depicted, fuel supply 14 routes a liquid fuel or gas fuel, such as natural gas, to the turbine system 10 through a fuel nozzle 12 into combustor 16. After mixing with pressurized air, shown by arrow 18, ignition occurs in combustor 16 and the resultant exhaust gas causes blades within turbine 20 to rotate. The coupling between blades in turbine 20 and shaft 22 will cause rotation of shaft 22, which is also coupled to several components throughout the turbine system 10, as illustrated. For example, the illustrated shaft 22 is drivingly coupled to a compressor 24 and a load 26. As appreciated, load 26 may be any suitable device that may generate power via the rotational output of turbine system 10, such as a power generation plant or a vehicle.

Air supply 28 may route air via conduits to air intake 30, which then routes the air into compressor 24. Compressor 24 includes a plurality of blades drivingly coupled to shaft 22, thereby compressing air from air intake 30 and routing it to fuel nozzles 12 and combustor 16, as indicated by arrows 32. Fuel nozzle 12 may then mix the pressurized air and fuel, shown by numeral 18, to produce an optimal mix ratio for combustion, e.g., a combustion that causes the fuel to more completely burn so as not to waste fuel or cause excess emissions. After passing through turbine 20, the exhaust gases exit the system at exhaust outlet 34. The turbine system 10 includes a variety of components that move and/or rotate, such as the shaft 22, relative to other components that are stationary during operation of the system 10. As discussed in detail below, an embodiment of turbine system 10 includes certain stator components with anti-rotation pins for routing cooling fluids to the hot parts of the shroud.

Figure 2:
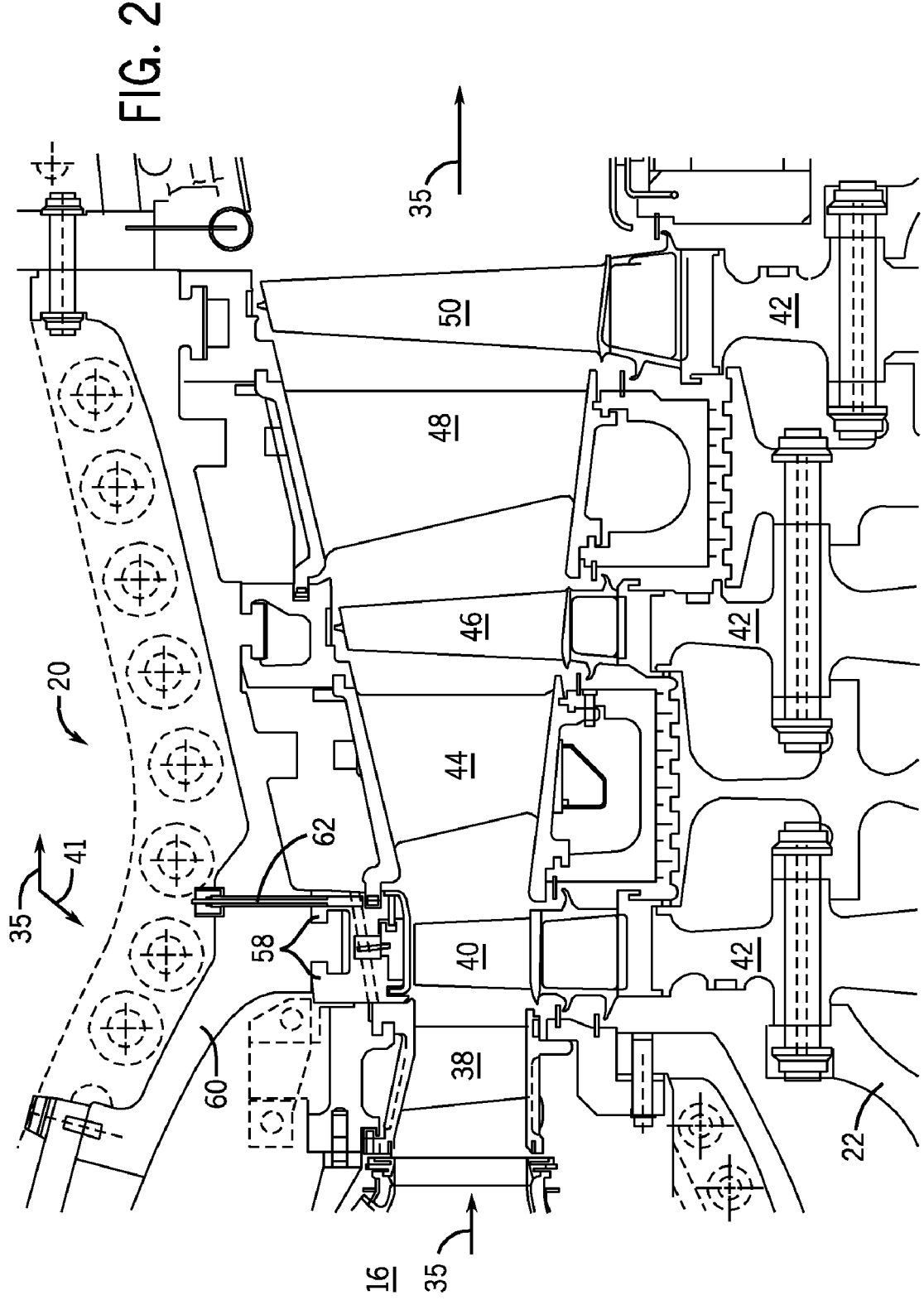
FIG. 2 is a cutaway side view of a turbine section, as shown in FIG. 1 in accordance with an embodiment of the present technique.

A detailed view of an embodiment of turbine 20 is illustrated in FIG. 2. Hot gas from the combustor 16 flows into the turbine 20 in an axial direction 35. The turbine 20 illustrated in the present embodiment includes three turbine stages. Other turbine configurations may include more or fewer turbine stages. For example, a turbine may include 1, 2, 3, 4, 5, 6, or more turbine stages. The first turbine stage includes nozzles 38 and buckets 40 (e.g., turbine blades) substantially equally spaced in a circumferential direction 41 about turbine 20. The first stage nozzles 38 are rigidly mounted to turbine 20 and configured to direct combustion gases toward the buckets 40. The first stage buckets 40 are mounted to a rotor 42 that rotates as combustion gases flow through the buckets 40. The rotor 42 is, in turn, coupled to the shaft 22 which drives compressor 24 and load 26 (see FIG. 1). The combustion gases then flow through second stage nozzles 44 and second stage buckets 46. The second stage buckets 46 are also coupled to rotor 42. Finally, the combustion gases flow through third stage nozzles 48 and buckets 50. As the combustion gases flow through each stage, energy from the combustion gases is converted into rotational energy of the rotor 42. After passing through each turbine stage, the combustion gases exit the turbine 20 in the axial direction 35.

As illustrated, first stage buckets 40 are surrounded by stator components such as a turbine shroud block 54, including a heat-resistant shroud inner liner 56. The shroud block 54 is coupled to a turbine casing 60 by hangers 58. The inner shroud 56 of the present embodiment may be employed in turbines 20 that operate at high temperatures to thermally insulate the shroud block 54. However, lower temperature turbines 20 may omit the inner shroud 56 if the shroud block 54 is configured to withstand the operational temperatures. The turbine shroud block 54 may minimize the quantity of combustion gases that bypass buckets 40. Specifically, a gap 59 between turbine shroud block 54 and buckets 40 provides a path for combustion gases to bypass buckets 40 as the gases flow downstream along axial direction 35. It should be appreciated that, in certain embodiments, the shroud block 54 is an example of a stator component of the turbine system 10 that may incorporate the anti-rotation pin described in further detail below.

Figure 3:
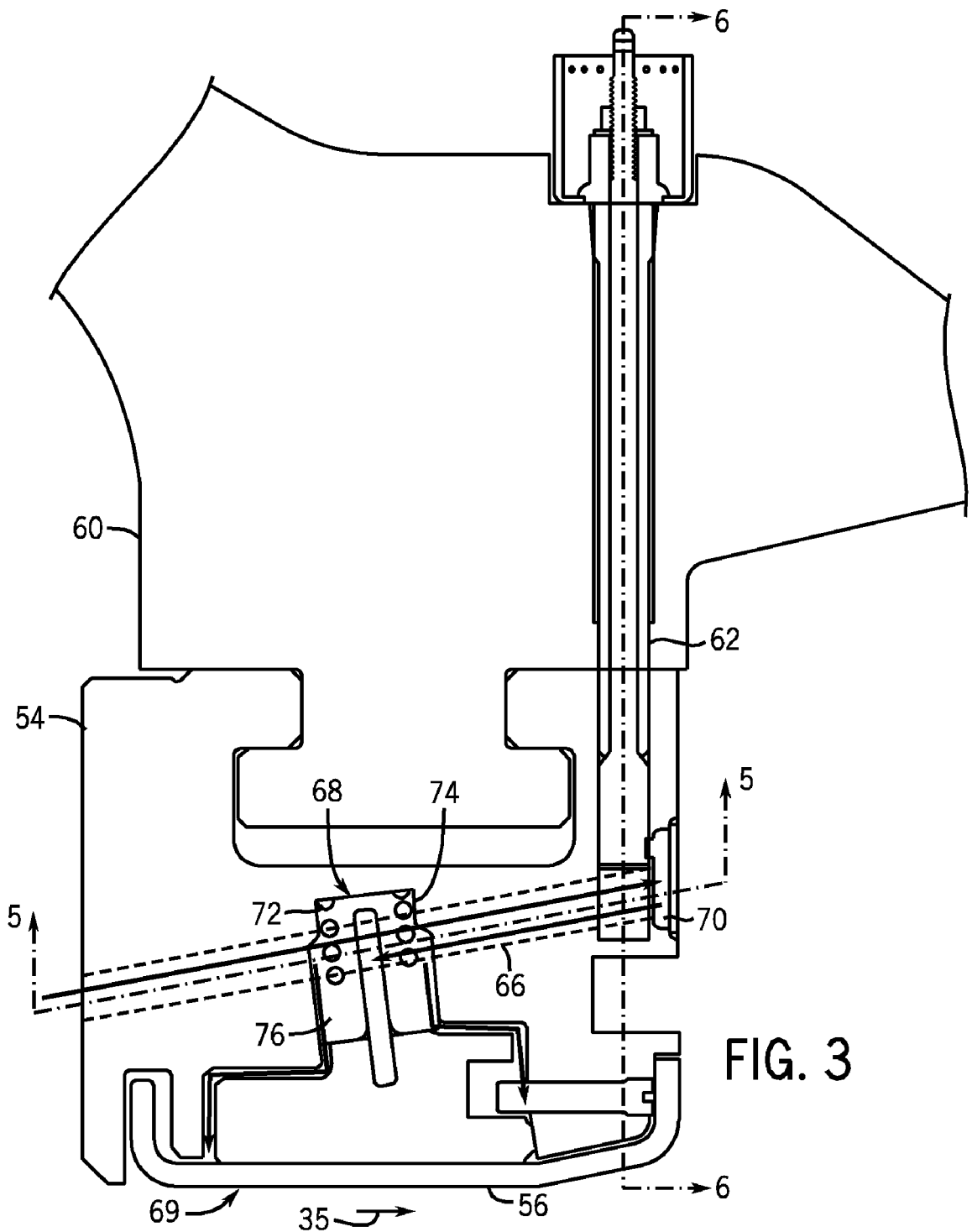
FIG. 3 is a cross-sectional view of an exemplary shroud block with an anti-rotation pin coupled to a turbine casing in accordance with an embodiment of the present technique.

FIG. 3 is a cross-sectional view of a shroud block 54 coupled to a casing 60 in a circumferential direction 41 relative to the flow of the hot gas stream through the turbine 20. As depicted, a shroud block 54 may include an anti-rotation pin 62 inserted into a pin passage (see FIG. 4) in the shroud block 54. The pin passage may be in fluid communication with a cooling passage 66 for transferring cooling fluid to a damping system 68 of the shroud block 54, for example from a supply passage 70, and may control the flow of cooling fluids through the cooling passage 66, as discussed in further detail below. A plurality of shroud blocks 54 may be disposed in a circumferential array about the turbine axis and mount a plurality of shroud inner liners 56 surrounding and forming a part of the hot gas path flowing through the turbine 20. The shroud inner liners 56, which may be formed of a ceramic composite, are secured by bolts, not shown, to the shroud blocks 54, and have an inner surface 69 in contact with the hot gases of the hot gas path 35. The shroud blocks 54 may be formed of a metal alloy that is sufficiently temperature tolerant to withstand moderate high temperature levels. Air from cooling passage 66 is intended to purge non-flowpath areas to ensure support structures are not subjected to high post-combustion temperatures beyond the melt point of certain alloys.

The damping system 68 may include a damping mechanism such as a spring 72. The spring 72 may be inserted into a central opening or passage 74 enabling cooling flow from compressor discharge air from cooling passage 66 to flow within the shroud block 54 to maintain the temperature of the spring below a predetermined temperature. Thus, the spring 72 may be formed from low-temperature metal alloys to maintain a positive preload that controls a damping block 78. The spring 72, therefore, may be designed to be kept below a predetermined specific temperature limit. The cooling medium may be supplied to the cooling passage 66 and spring passage 74. Passage 66 may also exhaust the spent cooling medium. Accordingly, the anti-rotation pin 62 may allow an operator to control the flow of cooling fluids from pin 62, which may provide a flow of discharge air from compressor 24 or any other suitable cooling medium, to the cooling passage 66. In turn, cooling fluid may enter spring passage 74 from the cooling passage 66 and moderate the temperature of components of the damping system 68, such as the spring 72. In embodiments, an operator may fine tune the cooling of individual damping systems 68 that are dispersed throughout a turbine 22 by operating certain actuatable components of the anti-rotation pin 62.

Figure 4:
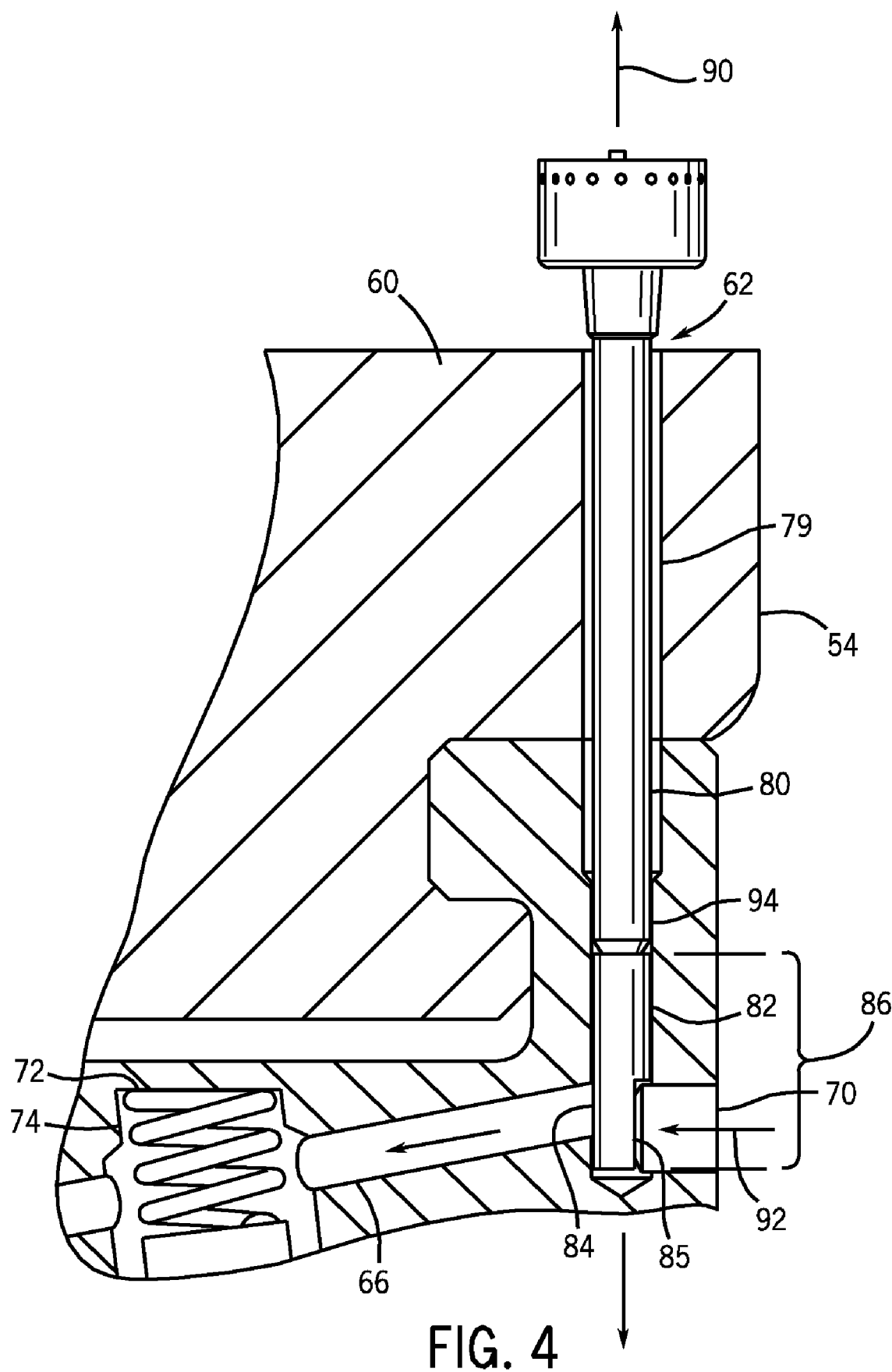
FIG. 4 is a partial cutaway side view of an anti-rotation pin in accordance with an embodiment of the present technique.

FIG. 4 is a partial cutaway side view of an embodiment of an anti-rotation pin 62 inserted into pin passage 79. The anti-rotation pin 62 may include a hollow shaft 80 into which a rod 82 has been inserted. The rod 82 includes a controlling feature for metering the flow of fluid, shown here as valve 84. As depicted, the valve 84 may be located on a distal end 86 of the rod 82. In other embodiments, the valve may be located more proximally, such that the valve is disposed at the midpoint or even more proximally on the rod 82. In such embodiments, the distal end of the rod 82 may extend past the fluid control point of the shroud block 54. The hollow shaft 80 and the rod 82 are concentric or coaxial about an axis of rotation 90. When the rod 82 is rotated about axis 90, valve 84, which may include a fin-shaped or disc-shaped butterfly valve structure 85, rotates, allowing passage of cooling fluid from supply passage 70 to enter cooling passage 66 and flow in a direction 92 towards spring passage 74 to cool spring 72. In other embodiments, the valve 84 may be a ball valve structure, a gate valve, or other valve type that may be opened or closed by rotation of rod 82. Further, the controlling feature may be any suitable device for metering flow, such as a sized aperture or other device that may be externally controlled. As shown, the distal end 86 of rod 82 extends beyond the distal end 94 of the hollow shaft 80 into the cooling passage 66. Because the hollow shaft may not substantially extend into the cooling passage 66, such an arrangement allows the valve 84 to control the flow in the cooling passage 66 when the rod 82 is rotated within the hollow shaft 80. As shown, the pin passage 79 may extend through one or more stator components, such as casing 60 and shroud block 54, allowing the pin 62 to provide structural support to the stator components while also providing a mechanism for controlling the flow of cooling medium to certain parts of the stator components.

Figure 6:
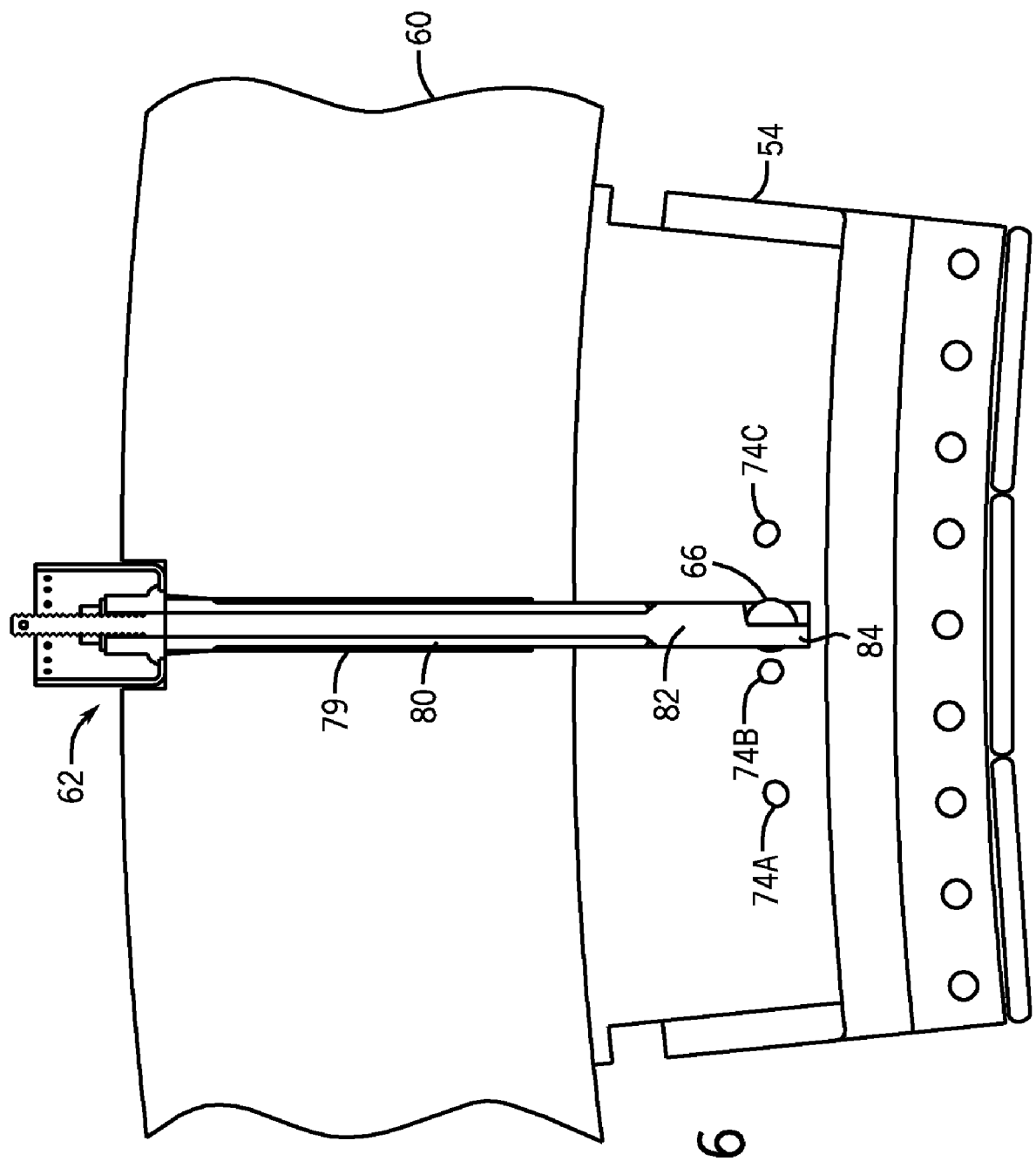
FIG. 6 is a cross-sectional side view the shroud block indicating the positions of the multiple plenum chambers within the block in relation to the anti-rotation pin.

FIG. 5A and FIG. 5B, which are top cross-sectional view of an exemplary shroud block 54, show alternative configurations of the valve 84, which may be in fluid communication with multiple spring passages 74 (74a, 74b, and 74c, as shown). A typical shroud block 54 may have three or more damping mechanisms per block 54. An anti-rotation pin 62 may be configured to control fluid to all, or just some, of the individual damping mechanisms in the block 54. When the valve 84 is open, as in FIG. 5A, cooling fluid may travel along path 92 to the plenum chambers, or passages, for cooling the damping parts of the shroud block 54. When the valve 84 is closed, as in FIG. 5B, flow of cooling air is blocked. FIG. 6 shows an axial view of the shroud block 54 indicating the relative positions of the individual spring passages 74 relative to the anti-rotation pin 62. The anti-rotation pin 62 prevents circumferential movement of the shroud block 54.

FIG. 7 is a cutaway side view of the anti-rotation pin 62 showing the rod 82 inserted into hollow shaft passage 94. As shown, rod 82 and shaft 80 are generally concentric around axis 90. Shaft passage 94 may be suitably sized and shaped to allow free rotation of the rod about axis 90 within shaft passage 94. To facilitate such rotation, the rod 82 may include certain structures to allow an operator to more easily rotate the rod 82. For example, a proximal end 96 of the rod 82 may extend from the shaft 80 enough so that an operator may grip the rod 82 with a tool (e.g., a wrench, pliers, a socket, a screwdriver) or otherwise control (e.g., via an automatic controller) rotation of the rod 82. In addition, the rod 82 may include a turning wheel 98 to facilitate the rotation of the rod 82. As shown, the turning wheel 98 may have teeth 99 or other structures. In embodiments, the teeth 99 may act as part of a locking system for the rod 82. For example, the rod 82 may be rotated such that valve 84 is open. When the valve 84 is in position, the rod 82 may be fixed in place by wrapping a wire or other device around teeth 99 and threading the wire through holes 100 on a collar 102 of the hollow shaft 80. In such an arrangement, the rod 82 may be fixed in rotational position relative to the axis 90 of hollow shaft 80. In addition, the rod 82 may include an oversized diameter on a distal portion 86 that blocks axial movement. In other words, key 106 blocks downward movement while oversized distal portion 86 blocks upward movement. The oversized distal portion 86 defines an annular lip that abuts the distal end 94 of hollow shaft 80.

In other embodiments, the rod 82 may also be fixed in place along the length of axis 90. In other words, the rod 82 may be prevented from moving up or down along the axis 90. For example, rod 82 may include a passage 104 through its proximal end 96 that is along an axis 103 or 105, or substantially orthogonal to axis 90. A key 106 may be inserted into the passage 104 to prevent movement in an up direction 112 or in a down direction 114 along axis 90. The key 106 may rest on washer 108 to be held in place. Such an arrangement may be used in embodiments in which the rod 82 includes another type of valve 84, such as a piston valve. In such an arrangement, the valve 84 may be opened when rod 82 is moved up 112 or down 114 along axis 90. For example, moving the rod up 112 may open the flow of passage 66. The rod may then be locked into the open position by inserting key 106 into passage 104. In embodiments, the rod 82 may include a number of passage 104 along axis 90 sized and shaped to receive key 104 to allow the rod to be locked into one of several possible positions along axis 90.

In embodiments, shaft passage 95 may be sealed to block leakage of fluids from cooling passage 66, which may flow up through the hollow shaft 80 through passage 95. The seal 110 may include a wire or other malleable structure or compound. When the rod 82 is turned about axis 90, the wire 110 is biased against the hollow shaft 80 and a collar 116 disposed on the rod 82. The rotation presses the wire 110 to form a seal that, in embodiments, may be easily removed.

Figure 8:
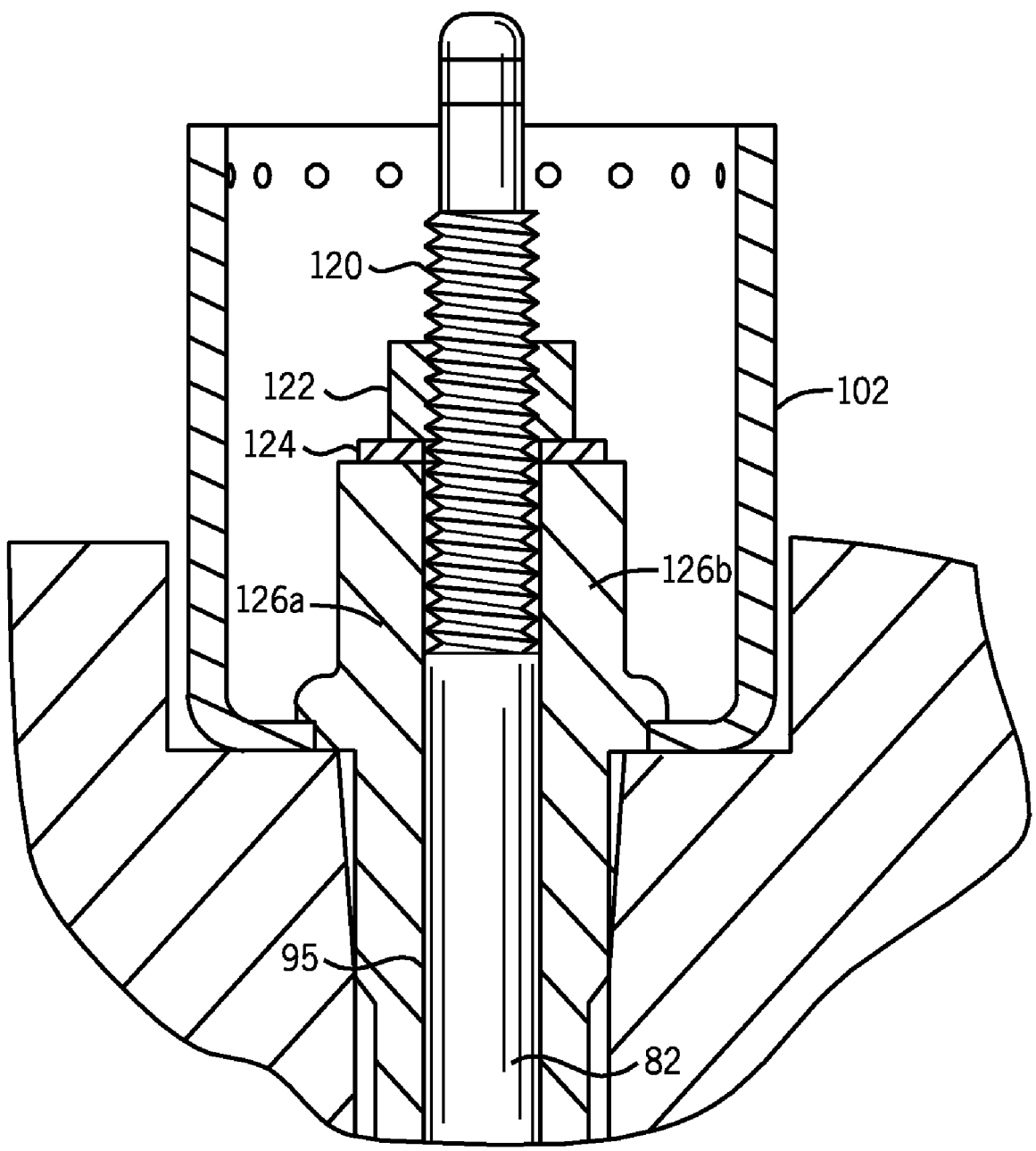
FIG. 8 is a cutaway side view of an anti-rotation pin in accordance with an alternative embodiment of the present technique.

In an alternative embodiment, shown in FIG. 8, shaft passage 95 may be sealed to block leakage of fluids with an interlocking mechanism that provides tension between the rod 82 and the hollow shaft 80. For example, the rod 82 may include threads 120 that may screw into threads on the hollow shaft 82 that may be formed on the interior of conical pieces 126a and 126b. The rod 82 and shaft 80 tensioning mechanism may include a nut 122 and washer 124.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A turbine system comprising:
   a turbine casing;
   a shroud block coupled to the turbine casing;
   a fluid passage in the shroud block; and
   a pin configured to interface with the fluid passage, the pin comprising:
      a hollow shaft;
      a rod inserted into the hollow shaft; and
      a controlling feature disposed on the rod, wherein the controlling feature is configured to open and close the fluid passage when the rod is rotated about an axis of the rod and the hollow shaft.

2. The turbine system of claim 1, wherein the fluid passage is in fluid communication with a damping mechanism of the shroud block.

3. The turbine system of claim 2, wherein the damping mechanism comprises a spring.

4. The turbine system of claim 1, wherein the fluid passage is in fluid communication with a heat-resistant lining of the shroud block.

5. The turbine system of claim 1, wherein the fluid passage is configured to transfer cooling fluid to the shroud block.

6. The turbine system of claim 5, comprising an opening in the shroud block in fluid communication with the fluid passage, wherein the opening is configured to transfer cooling fluid when the valve is open.

7. The turbine system of claim 1, wherein the pin extends through both the shroud block and the turbine casing.

8. The turbine system of claim 1, wherein the controlling feature comprises a butterfly valve.

9. The turbine system of claim 1, wherein the controlling feature comprises a ball valve, or a piston valve.

10. A turbine system, comprising:
    a stator component comprising a cooling fluid passage; and
    an anti-rotation pin inserted mounted in a receptacle in the stator component, wherein the anti-rotation pin comprises:
       a hollow shaft;
       a rod inserted into the hollow shaft, wherein a distal end of the rod extends beyond the hollow shaft into the cooling fluid passage; and
       a valve disposed on the distal end of the rod, wherein the valve is configured to open and close when the rod is rotated about an axis of the rod and the hollow shaft.

11. The turbine system of claim 10, wherein the stator component comprises a turbine shroud.

12. The turbine system of claim 10, wherein the stator component comprises a spring.

13. The turbine system of claim 10, wherein the pin supports the stator component in a circumferential direction.

14. An anti-rotation pin for a turbine system, comprising:
    a hollow shaft;
    a rod inserted into the hollow shaft; and
    a valve disposed on a portion of the rod extending past the hollow shaft along an axis of the rod and the hollow shaft, wherein the valve is configured to be opened and closed when the rod is moved relative to the hollow shaft.

15. The anti-rotation pin of claim 14, wherein the valve is configured to be opened and closed when the rod is rotated about the axis of the rod and the hollow shaft.

16. The anti-rotation pin of claim 14, wherein the valve is configured to be opened and closed when the rod is moved in a direction along the axis of the rod and the hollow shaft.

17. The anti-rotation pin of claim 14, comprising a key configured to block rotation of the rod about the axis of the rod and the hollow shaft.

18. The anti-rotation pin of claim 17, wherein the key extends through a first passage in a first proximal end of the hollow shaft and a second passage in a second proximal end of the rod.

19. The anti-rotation pin of claim 14, wherein the key comprises a wire.

20. The anti-rotation pin of claim 14, comprising a removable seal between the hollow shaft and the rod.

21. The anti-rotation pin of claim 14, comprising interlocking surfaces between the hollow shaft and the rod.

* * * * *